(12) United States Patent
Denley

(10) Patent No.: US 6,282,801 B1
(45) Date of Patent: Sep. 4, 2001

(54) NON-HANDED HORIZONTAL ADJUSTOR MECHANISM

(75) Inventor: Ronald S. Denley, Woodstock, IL (US)

(73) Assignee: Elco Tectron Inc., Rockford, IL (US)

( * ) Notice: Subject to any disclaimer, the term of this patent is extended or adjusted under 35 U.S.C. 154(b) by 0 days.

(21) Appl. No.: 09/293,853

(22) Filed: Apr. 16, 1999

(51) Int. Cl.$^7$ .................................................. G01B 5/25

(52) U.S. Cl. .............................................................. 33/288

(58) Field of Search ........................ 33/288, 286, 600, 33/645

(56) References Cited

U.S. PATENT DOCUMENTS

| | | | |
|---|---|---|---|
| 5,707,133 | * | 1/1998 | Burton .................................. 33/288 |
| 5,746,000 | * | 5/1998 | Schmitt .................................. 33/288 |
| 5,758,943 | * | 6/1998 | Shirai et al. ............................ 33/288 |

* cited by examiner

*Primary Examiner*—G. Bradley Bennett
(74) *Attorney, Agent, or Firm*—Texler, Bushnell, Giangiorgi, Blackstone & Marr, Ltd.

(57) ABSTRACT

A non-handed horizontal headlamp adjustor mechanism. The mechanism includes a directing member and drive structure operatively coupled to the directing member. The directing member is engageable with a reflector of a headlamp assembly mounted in a vehicle. The drive structure is rotatable to effect movement of the directing member and adjust a position of the reflector. Indicia is provided on the mechanism generally proximate the drive member. The indicia relates to which direction to rotate the drive structure to effect movement of the reflector in a direction which is either toward or away from a centerline of the vehicle. The indicia renders the headlamp adjustor mechanism usable with headlamp assemblies of the vehicle which are both right and left of the centerline of the vehicle, and the indicia is accurate with respect to rotation of the drive structure and resulting movement of the reflector regardless of whether the headlamp adjustor mechanism is engaged with a headlamp assembly which is to the right or left of the centerline of the vehicle. As a result, the horizontal headlamp adjustment mechanism provides cost savings in labor, parts, and logistics of producing equal quantities of each because the same mechanism can be installed on either side of the vehicle and still provide accurate indicia.

20 Claims, 4 Drawing Sheets

Prior Art

NON-HANDED HORIZONTAL ADJUSTOR MECHANISM

BACKGROUND OF THE INVENTION

The present invention relates generally to headlamp adjustor mechanisms for adjusting the aiming of automotive headlamps in the horizontal direction, and relates more specifically to a horizontal headlamp adjustor mechanism which is non-handed. The horizontal headlamp adjustor mechanism is non-handed in that indicia thereon which indicates the headlamp adjustment which ultimately results from rotating drive structure of the headlamp adjustor mechanism in a given direction is accurate regardless of whether the headlamp adjustor mechanism is engaged with a headlamp assembly which is located to the right or left of a centerline of the vehicle.

Modern day headlamps for vehicles have been engineered and designed to be aerodynamically efficient. In this regard, modern day headlamps are designed as sealed assemblies wherein the portion of the headlamp proximate the outer surface of the automobile is relatively stationary, and is aerodynamic. FIG. 1 depicts a vehicle 10 having two headlamp assemblies 12 and 14 installed—one headlamp assembly 12 installed to the right of a centerline 16 of the vehicle 10, and one headlamp assembly 14 installed to the left of the centerline 16 of the vehicle 10 (where the direction with relation to the centerline 16 is taken using a hypothetical driver of the vehicle as a reference).

A typical modem day headlamp assembly 12 is illustrated in a plan view seen as FIG. 2, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 26, and a second pivot point 30 is disposed generally horizontal of the fixed pivot 26. As such, the movable reflector 24 may be pivoted about the fixed pivot 26 in the vertical and horizontal planes to aim the headlamp beam. Adjustor mechanisms 40 and 42 are typically provided at the first and second pivot points, 28 and 30, normally termed the vertical pivot and the horizontal pivot, and the adjustor mechanisms 40 and 42 can be operated to effect movement of the reflector 24 in the vertical and horizontal planes.

The adjustor mechanisms 40 and 42 are typically mounted to the housing 20 of the headlamp assembly 12 and have adjustor screws 44, 46 operatively connected to the movable reflector 24 by ball and socket type pivots, or the like, such that linear movement of the adjustor screws 44, 46 produces pivoting of the movable reflector in the vertical and horizontal planes. Specifically, each adjustor mechanism 40, 42 typically includes drive structure 48, 50 for receiving a tool, and typically the drive structure 48, 50 is geared, such as at a right angle, to the adjustor screw 44, 46. The gearing provides that using the tool to rotate the drive structure 48, 50 causes linear translation of the adjustor screw 44, 46 and therefore adjustment of the position of the headlamp reflector 24. Each adjustor mechanism 40, 42 also may include a ring gear or indicator (not specifically shown in FIG. 2) which is geared or otherwise coupled to the drive structure, and the indicator moves when the drive structure is actuated. The indicator co-operates with a pointer or other indicating means to indicate the resulting adjustment in the aiming of the headlamp.

Typically, all vertical adjustor mechanisms (adjustor mechanisms engaged with headlamp assemblies to provide vertical adjustment) of a vehicle are operatively connected above the fixed pivot of the respective headlamp assembly. Hence, a given adjustment, such as a clockwise rotation, of the drive structure of each adjustor mechanism will result in the same adjustment, in terms of direction, of the headlamp reflectors, regardless of whether the given adjustor mechanism is located to the right or left of a centerline of the vehicle. For example, if each vertical adjustor mechanism is configured such that clockwise rotation of the drive structure results in the adjustor screw extending, then clockwise rotation of the drive structure of each vertical adjustor mechanism results in the respective headlamp reflector pivoting downward. Therefore, vertical adjustor mechanisms typically provide that a given direction of rotation of the drive structure results in an adjustment of the headlamp in a given direction, regardless of whether the adjustor mechanism is located right or left of the centerline of the vehicle. As a result, identical indicia indicating which direction to rotate the drive structure to effect a given adjustment of the headlamp can be employed with each vertical adjustor mechanism, and the indicia will be accurate regardless of which side of the vehicle the adjustor mechanism is located. In other words, vertical adjustor mechanisms are "non-handed", meaning that the same vertical adjustor mechanism can be installed on both sides of a vehicle, and the indicia thereon will be accurate.

In contrast, as shown in FIG. 3, a horizontal adjustor mechanism 60 which is located right of a centerline 16 of a vehicle 10 (using the driver as a reference—see also FIG. 1) provides that extension of the adjustor screw 62 results in the respective headlamp reflector 64 pivoting to the right, while a horizontal adjustor mechanism 66 which is located left of a centerline 16 of a vehicle 10 (using the driver as a reference—see also FIG. 1) provides that extension of the adjustor screw 68 results in the respective headlamp reflector 70 pivoting to the left. As a result, horizontal adjustor mechanisms which are located right of the centerline of a vehicle typically have different indicia thereon then do those horizontal adjustor mechanisms which are located left of the centerline, where in both cases the indicia indicates which direction to rotate the respective drive structure to cause a given adjustment of the headlamp reflector. Therefore, while typical vertical adjustor mechanisms are "non-handed", and can be used on either side of a vehicle, typical horizontal adjustor mechanisms are "handed", in that the indicia of horizontal adjustor mechanisms which are located to the right of the vehicle centerline are different than those which are located to the left of the vehicle centerline. The difference being that the fixed pivot location of the respective headlamp assemblies are handed by design.

FIGS. 4 and 5 show indicia 80 and 90 which is included on horizontal adjustor mechanisms which are presently commercially available, where the indicia 80 and 90 provides that the horizontal adjustor mechanisms are "handed". Specifically, FIG. 4 provides a top view of a "handed" horizontal adjustor mechanism 100 which is typically mounted in a vehicle to the right of a centerline of the vehicle, and FIG. 5 provides a top view of a "handed" horizontal adjustor mechanism 102 which is typically mounted in a vehicle to the left of a centerline of the vehicle. As shown, each adjustor mechanism includes a pointer 104, 106 which co-operates with degree markings on a respective indicator 108, 110 to indicate the adjustment of the headlamp which results from rotating the drive structure 112, 114. As shown, each indicator 108, 100 typically includes degree markings and indicia 80, 90 which indicates which direction to rotate the drive structure 112, 114 to cause a given adjustment of the headlamp. Alternatively, another type of horizontal adjustor mechanism which is commercially available provides similar indicia on a housing of the mechanism, generally proximate the drive structure, rather than on an indicator of the mechanism. Regardless, as shown in FIGS. 4 and 5, the indicia 80 on horizontal adjustor mechanisms 100 which are used to the right of the vehicle centerline (FIG. 4) is different than the indicia 90 on horizontal adjustor mechanisms 102 which are used to the left of the vehicle centerline (FIG. 5). Hence, the indicia 80, 90 provides that the two horizontal adjustor mechanisms 100, 102 are "handed," and provides the only physical difference between the adjustor mechanisms.

Providing that horizontal adjustor mechanisms are "handed" and include different indicia depending on which side of the vehicle the mechanism is located provides increased cost in terms of parts, labor, and logistics of producing equal quantities of each. This is because different parts (i.e. different indicators, or different housings, etc.) need to be provided for the two different horizontal adjustor mechanisms (those for use to the right of the vehicle centerline vs. those for use to the left of the vehicle centerline), and the mechanic who installs the horizontal adjustor mechanisms must take care to install them on the correct side of the vehicle so that the indicia on the mechanisms will be accurate with respect to the headlamp adjustment which results from a given direction of rotation of the drive structure. Also, the mechanic faces the driver while making the adjustment, which makes his left/right reference opposite to the indicia on the adjustor mechanism, thus adding an element of confusion.

OBJECTS AND SUMMARY

Accordingly, it is an object of the present invention to provide a horizontal headlamp adjustor mechanism which is "non-handed".

Another object of the present invention is to provide a horizontal headlamp adjustor mechanism which includes indicia that indicates which direction to rotate drive structure of the mechanism to cause a given adjustment of the headlamp reflector to which the horizontal headlamp adjustor is engaged, and the indicia is accurate regardless of whether the mechanism is located to the right or to the left of a vehicle centerline.

Briefly, and in accordance with one or more of the foregoing objects, the present invention provides a non-handed horizontal headlamp adjustor mechanism. A horizontal headlamp adjustor mechanism which is in accordance with one embodiment of the present invention includes a directing member and drive structure operatively coupled to the directing member, as well as an indicator which is coupled to the drive structure. The directing member is engageable with a reflector of a headlamp assembly mounted in a vehicle. The drive structure is rotatable to effect movement of the directing member and adjust a position of the reflector, and the indicator moves upon rotation of the drive structure. Indicia is provided generally proximate the drive structure, preferably on the indicator or on a housing of the mechanism, and the indicia relates to which direction to rotate the drive structure to effect movement of the reflector in a direction which is either toward or away from a centerline of the vehicle. The indicia renders the headlamp adjustor mechanism usable with headlamp assemblies of the vehicle which are both right and left of the centerline of the vehicle, and the indicia is accurate with respect to rotation of the drive structure and resulting movement of the reflector regardless of whether the headlamp adjustor mechanism is engaged with a headlamp assembly which is to the right or left of the centerline of the vehicle.

By providing that a horizontal headlamp adjustor mechanism is "non-handed", the mechanism can be engaged with a headlamp assembly which is to the right or left of the centerline of the vehicle, and regardless, the indicia thereon will be accurate. As a result, providing that horizontal headlamp adjustor mechanisms are "non-handed" reduces costs and labor because identical horizontal adjustor mechanisms can be installed on both sides of the vehicle.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF EMBODIMENTS OF THE INVENTION

Figure 1:
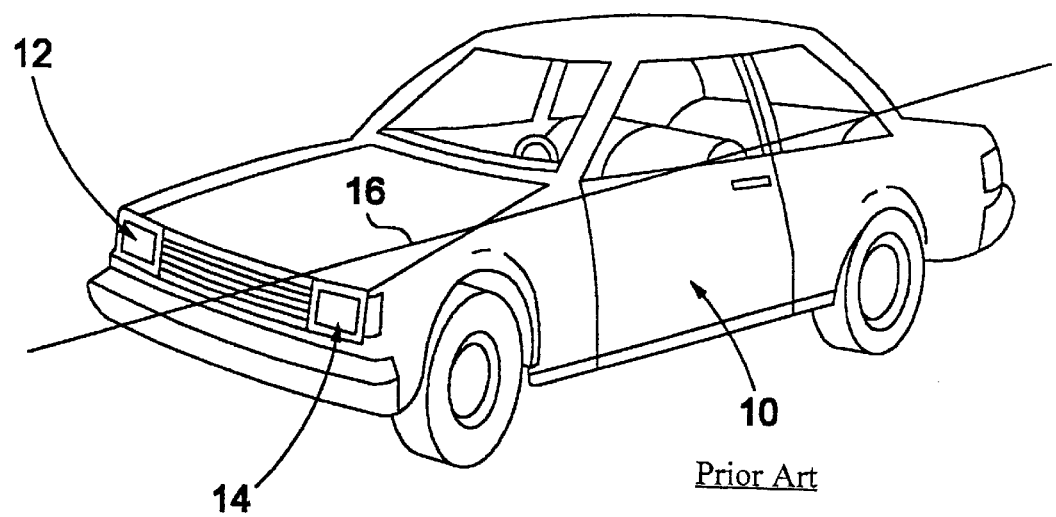
FIG. 1 is a schematic view of a vehicle having two headlamp assemblies mounted thereon, one on each side of a centerline of the vehicle.

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 6:
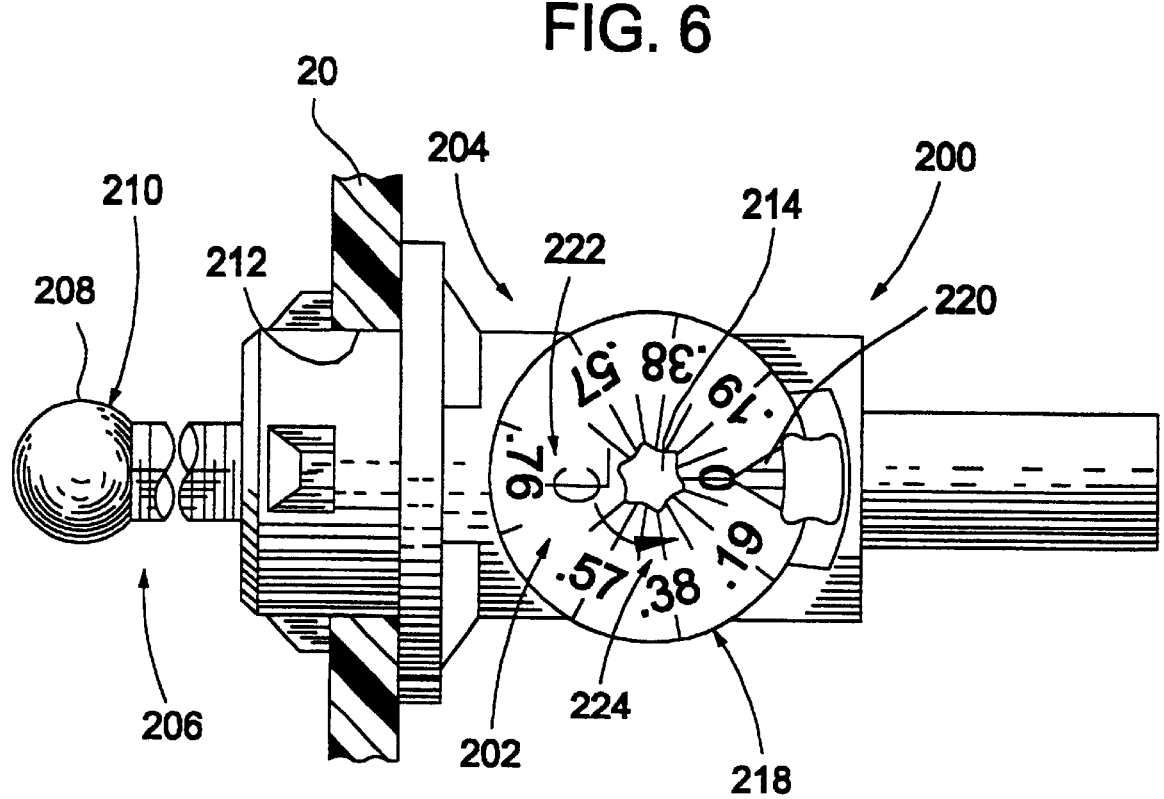
FIG. 6 is a top plan view of a "non-handed" horizontal adjustor mechanism which is in accordance with an embodiment of the present invention, having indicia which provides that the horizontal adjustor mechanism can be mounted in a vehicle to the right or left of a centerline of a vehicle, and the indicia will be accurate regardless.

FIG. 6 illustrates a "non-handed" horizontal adjustor mechanism 200 having indicia 202 thereon which renders the mechanism "non-handed". FIGS. 7*a*–7*e* depict alternative indicia (202*a*, 202*b*, 202*c*, 202*d* and 202*e*) which can be utilized with the horizontal adjustor mechanism 200 shown in FIG. 6. The horizontal adjustor mechanism 200 is "non-handed" meaning it can be employed to the right or to the left of the centerline of a vehicle (see FIGS. 1 and 3), and, as will be described more fully later herein, the indicia thereon will be accurate regardless of on which side of the vehicle the mechanism 200 is ultimately installed.

Figure 4:
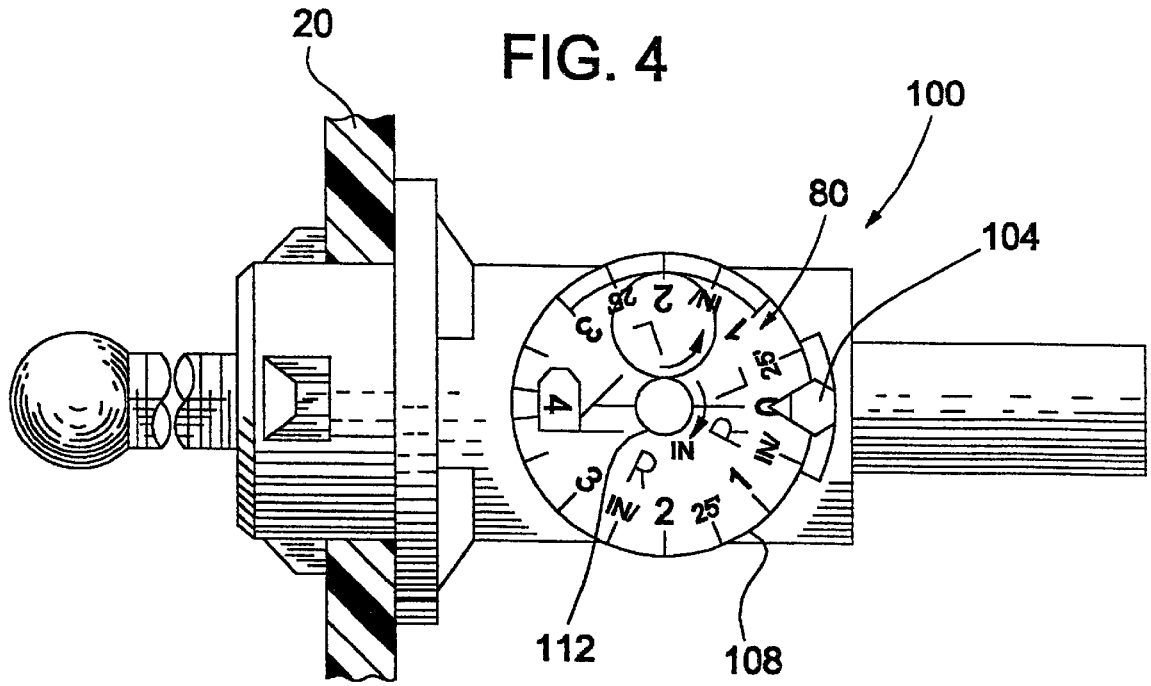
FIG. 4 is a top view of a "handed" horizontal adjustor mechanism which is typically mounted in a vehicle to the right of a centerline of the vehicle (using the driver as a reference)
Figure 5:
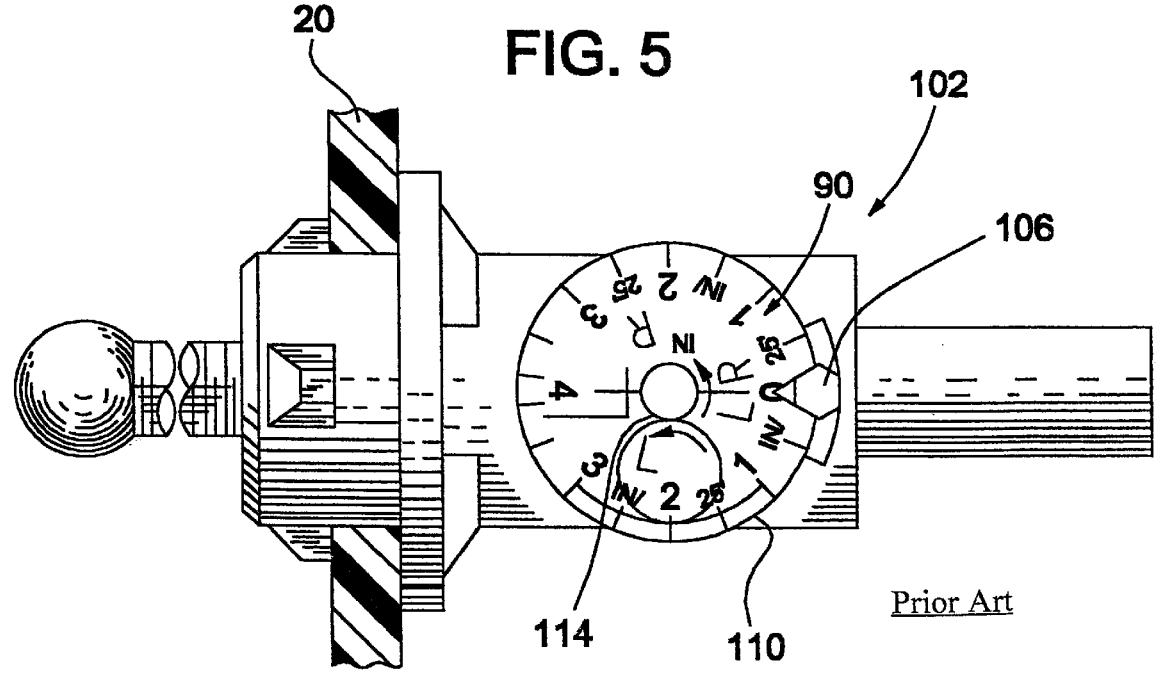
FIG. 5 is a top view of a "handed" horizontal adjustor mechanism which is typically mounted in a vehicle to the left of a centerline of the vehicle (using the driver as a reference)

Preferably, the horizontal adjustor mechanism 200 illustrated in FIG. 6 is structurally and functionally identical to that which is disclosed in U.S. patent application Ser. No. 08/831,663, which is now U.S. Pat. No. 5,897,202, except that indicia thereon is "non-handed" rather than "handed" as shown in FIGS. 4 and 5 herein and as shown in FIG. 6 of U.S. patent application Ser. No. 08/831,663. Because the horizontal adjustor mechanism illustrated in FIG. 6 is preferably structured identical to that which is disclosed in U.S. patent application Ser. No. 08/831,663, except that indicia thereon is different, U.S. patent application Ser. No. 08/831,663 is hereby incorporated herein in its entirety by reference. While the basic overall structure and functioning of the horizontal adjustor mechanism 200 is described below, the following description focuses primarily on the indicia thereof, and one is hereby referred to U.S. patent application Ser. No. 08/831,663 for a further description of the structure and functioning thereof.

Figure 2:
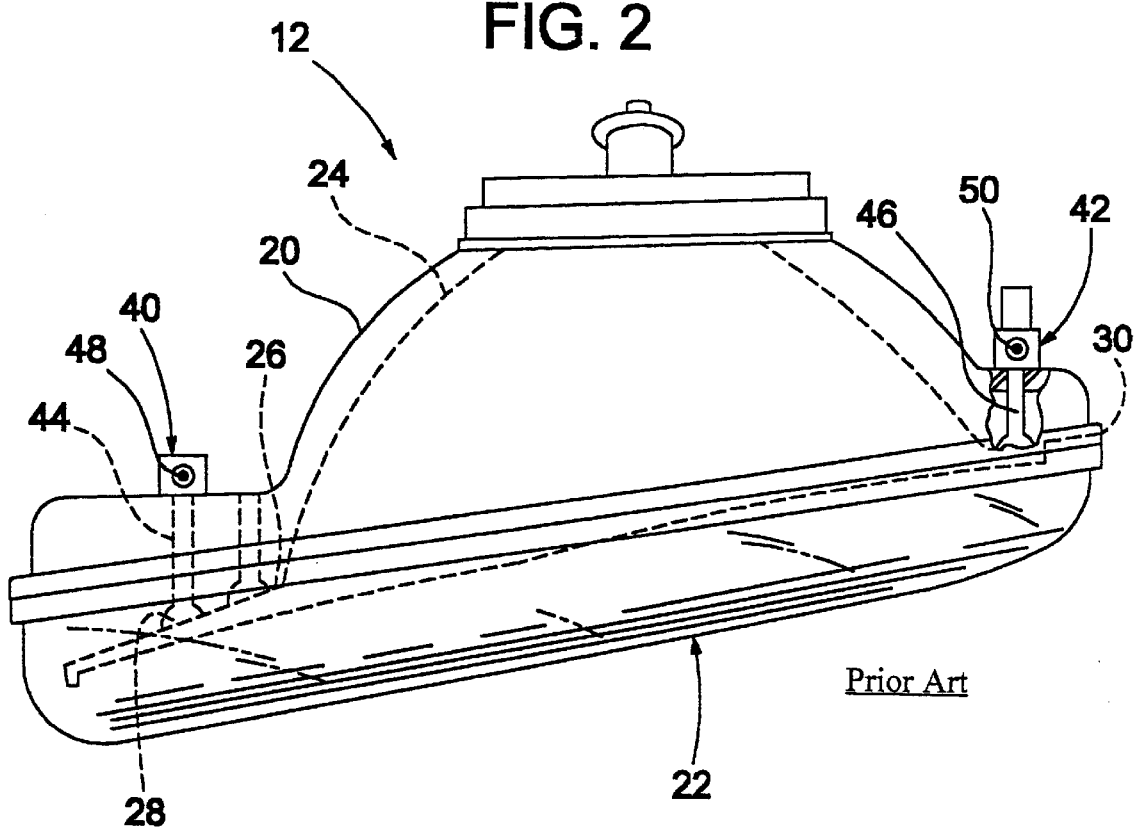
FIG. 2 is a plan view of a typical headlamp assembly.
Figure 3:
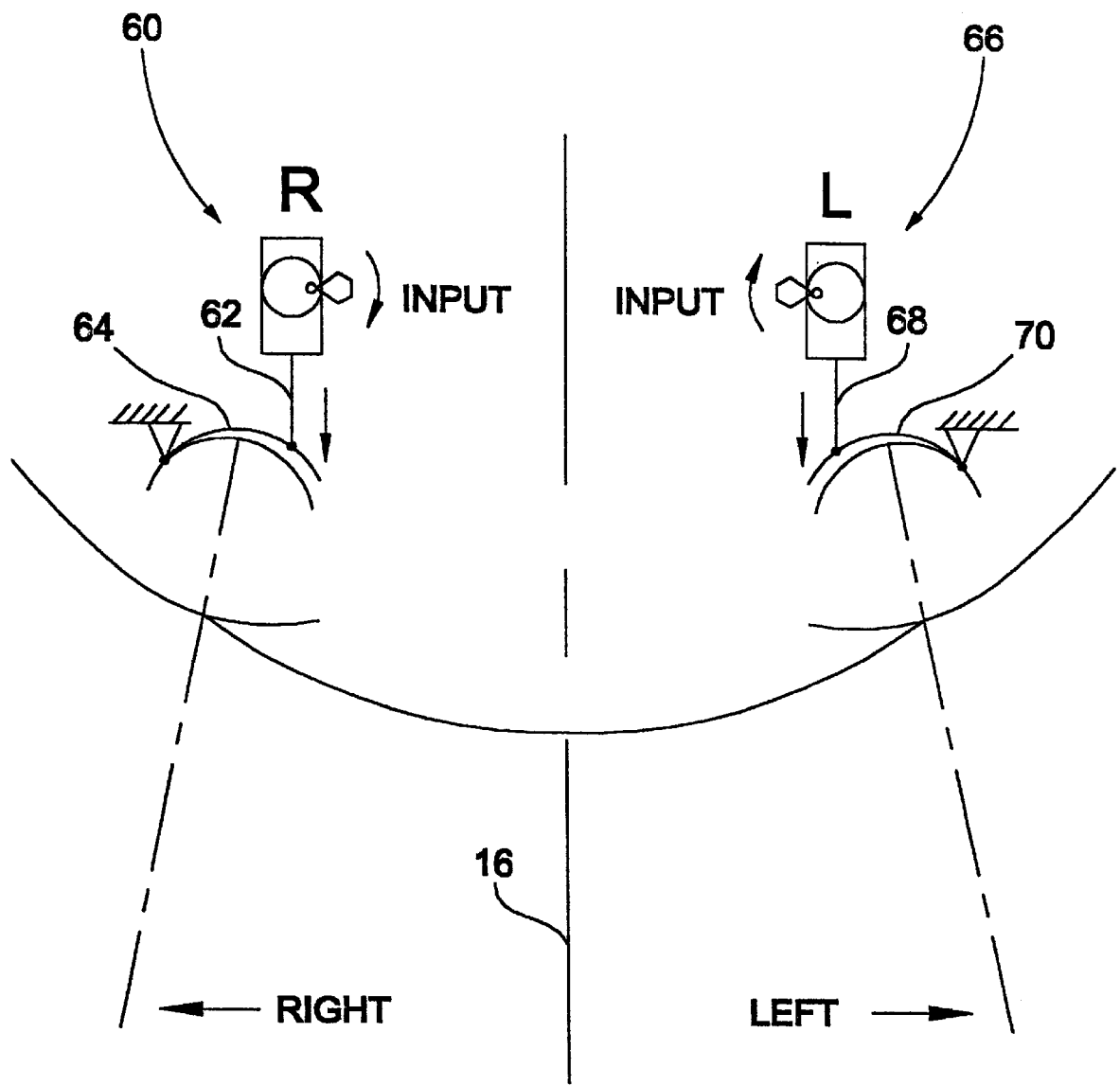
FIG. 3 is schematic view showing horizontal adjustor mechanisms engaged with headlamp reflectors of headlamp assemblies which are left and right of a centerline of a vehicle.

As shown in FIG. 6, the horizontal adjustor mechanism 200 includes a housing 204 which engages the housing 20 of a headlamp assembly, and includes an adjustor screw 206 which extends from the housing and engages a reflector of the headlamp assembly (see also FIGS. 2 and 3 herein). The end 208 of the adjustor screw 206 may provide a generally spherical portion 210, as is readily known in the art, for engaging in a corresponding socket on the headlamp reflector such that the end of the adjustor screw 206 can pivot in the socket upon linear translation.

Preferably, the housing 204 is configured to engage the housing 20 of the headlamp assembly by inserting the end of the housing 204 into an aperture 212 in the housing 20 of the headlamp assembly, and rotating the housing 204 of the mechanism one third turn to lock the housing 204 in place relative to the headlamp assembly (i.e. preferably the mechanism is "third turn" and "quick connect" mounted. Alternatively, the mechanism may be "quarter turn" mounted, or mountable in some other fashion). An elastomeric sealing structure (not shown) may be provided between the housing 204 of the mechanism and the housing 20 of the headlamp assembly to provide an axial force between the housings 204 and 20 and generally prevent moisture from entering the headlamp assembly through the aperture 212 in the housing 20.

The mechanism 200 also includes drive structure 214 which is geared with or otherwise coupled to the adjustor screw 206, and, as shown, may include a ring gear or indicator 218 which is geared with or otherwise coupled to the drive structure 214. Preferably, the drive structure 214 is configured for engagement with a tool, and rotation of the drive structure 214 using the tool causes the adjustor screw 206 to translate thereby adjusting the position of the headlamp reflector. For example, the drive structure 214 may be configured for engagement with a multi-lobular driver such as a Torx® bit, or another suitably configured driver. Regardless, when the drive structure 214 is rotated, the adjustor screw 206 translates, and the indicator 218, if provided, rotates thereby moving relative to an arrow 220 or other indicating means provided on the mechanism 200. All this, including how the indicator 218 may be configured to indicate undesired movement of the headlamp reflector due to vibrations, etc., is described in detail in U.S. patent application Ser. No. 08/831,663.

As shown in FIG. 6, the indicator 218 preferably includes degree markings which co-operate with the arrow 220 on the mechanism 200 to indicate the headlamp adjustment which results from rotating the drive structure 214. In addition to degree markings, the indicator also preferably includes indicia 202 thereon for indicating which direction to rotate the drive structure 214 to effect a given movement in the headlamp reflector with the adjustor screw 206. Specifically, the indicia 202 preferably includes a centerline indicator 222 which effectively corresponds to the centerline 16 of the vehicle 10 (see FIGS. 1 and 3), and a direction indicator 224 associated with the centerline indicator 222 which indicates which direction to rotate the drive structure 214 to effect movement of the headlamp reflector toward or away from the centerline 16 of the vehicle 10.

Specifically, the indicia 202 shown in FIG. 6 includes a direction indicator 224 which consists of a single arrow which is spaced generally counterclockwise from the centerline indicator 222, and points generally away from the centerline indicator 222. In this case, if the mechanism 200 is configured to provide that a counterclockwise rotation of the drive structure 214 causes the adjustor screw 206 to extend, the indicia 202 effectively communicates to a mechanic that rotation of the drive structure 214 in the direction in which the arrow points (counterclockwise) will result in the headlamp reflector pivoting away from the centerline 16 of the vehicle 10 (hence the arrow points away from the centerline indicator 222).

Figure 7A:
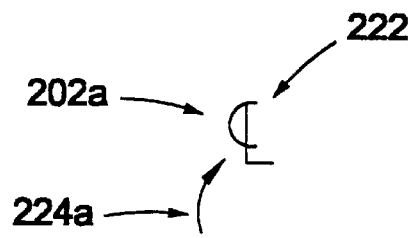
FIGS. 7*a*–7*e* depict alternative indicia which can be utilized with the horizontal adjustor mechanism shown in FIG. 6.

In contrast to that which is illustrated in FIG. 6, as shown in FIG. 7a, the indicia 202a may provide that the direction indicator 224a consists of a single arrow which is spaced generally counterclockwise from the centerline indicator 222, and points generally toward the centerline indicator 222. Such indicia 202a would effectively communicate to a mechanic that rotation of the drive structure 214 in the direction in which the arrow points (clockwise) will result in the headlamp reflector pivoting toward the centerline 16 of the vehicle 10 (hence the arrow points toward the centerline indicator 222).

Figure 7B:
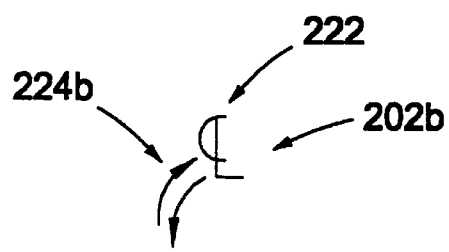

Still further, as shown in FIG. 7b, indicia 202b can be employed, where the indicia 202b is effectively a combination of the indicia 202 and 202a shown in FIGS. 6 and 7a, respectively. As shown in FIG. 7b, the indicia 202b provides that the direction indicator 224b consists of two arrows spaced generally counterclockwise from the centerline indicator 222. In such a case, the indicia 202b would effectively communicate to a mechanic that rotation of the drive structure 214 in a clockwise direction will result in the headlamp reflector pivoting toward the centerline 16 of the vehicle 10 while rotation of the drive structure 214 in a counterclockwise direction will result in the headlamp reflector pivoting away from the centerline 16 of the vehicle 10.

Figure 7C:
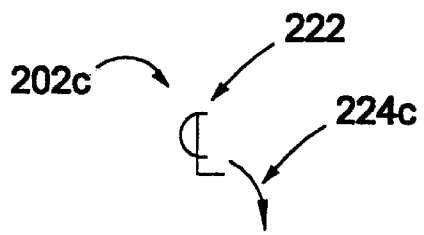

Alternatively, if the mechanism 200 is configured to provide that a clockwise rotation of the drive structure 214 causes the adjustor screw to extend, then, as shown in FIG. 7c, the indicia 202c may provide that the direction indicator 224c consists of a single arrow which is spaced generally clockwise from the centerline indicator 222, and pointing generally away from the centerline indicator 222. In such a case, the indicia 202c would effectively communicate to a mechanic that rotation of the drive structure 214 in the direction in which the arrow points (clockwise) will result in the headlamp reflector pivoting away from the centerline 16 of the vehicle 10.

Figure 7D:
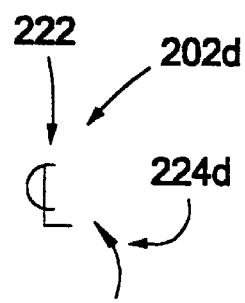

Still further, if the mechanism 200 were configured to provide that a clockwise rotation of the drive structure causes the adjustor screw to retract, then, as shown in FIG. 7d, the indicia 202d may provide that the direction indicator 224d consists of a single arrow spaced generally clockwise from the centerline indicator 222, and pointing generally toward the centerline indicator 222. In such a case, the indicia 202d would effectively communicate to a mechanic that rotation of the drive structure 214 in the direction in which the arrow points (counterclockwise) will result in the headlamp reflector pivoting toward the centerline 16 of the vehicle 10.

Figure 7E:
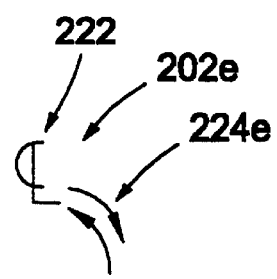

Still further, if the mechanism 200 were configured to provide that a clockwise rotation of the drive structure 214 causes the adjustor screw 206 to extend, indicia 202e as shown in FIG. 7e may be used, where the indicia 202e is effectively a combination of the indicia 202c and 202d shown in FIGS. 7c and 7d, respectively. As shown in FIG. 7e, the indicia 202e provides that the direction indicator 202e consists of two arrows spaced generally clockwise from the centerline indicator 222. In such a case, the indicia 202e would effectively communicate to a mechanic that rotation of the drive structure 214 in a clockwise direction will result in the headlamp reflector pivoting away from the centerline 16 of the vehicle 10 while rotation of the drive structure 214 in a counterclockwise direction will result in the headlamp reflector pivoting toward the centerline 16 of the vehicle 10.

Any of the indicia 202 and 202a–202e illustrated in FIGS. 6 and 7a–7e, respectively, can be employed in connection with the horizontal adjustor mechanism 200 shown in FIG. 6 to provide that the horizontal headlamp adjustor mechanism 200 is "non-handed", or can be installed either to the right or to the left of the centerline 16 of a vehicle 10, and the indicia will be accurate with respect to the headlamp adjustment which results from rotating the drive structure 214 in a given direction.

Of course, the appearance of the indicia may appear different than as shown in FIGS. 6 and 7a–7e without departing from the present invention. Additionally, the mechanism itself may be structure quite differently and function quite differently than as shown and described herein. While embodiments of the present invention are shown and described, it is envisioned that those skilled in the art may devise various modifications without departing from the spirit and scope of the appended claims.

What is claimed is:

1. A headlamp adjustor mechanism including a directing member and drive structure operatively coupled to the directing member, wherein the directing member is engageable with a reflector of a headlamp assembly mounted in a vehicle, and wherein the drive structure is rotatable to effect movement of the directing member and adjust a position of the reflector, said headlamp adjustor mechanism comprising a rotatable ring gear; and indicia on the ring gear generally proximate the drive structure, wherein the indicia relates to which direction to rotate the drive structure to effect movement of the reflector in a direction which is either toward or away from a centerline of the vehicle, wherein the indicia renders the headlamp adjustor mechanism usable with headlamp assemblies of the vehicle which are both right and left of the centerline of the vehicle, wherein the indicia is accurate with respect to rotation of the drive structure and resulting movement of the reflector regardless of whether the headlamp adjustor mechanism is engaged with a headlamp assembly which is to the right or left of the centerline of the vehicle, and wherein the ring gear is rotatable relative to the drive structure.

2. The headlamp adjustor mechanism according to claim 1, wherein the indicia indicates that rotation of the drive structure in an indicated direction moves the headlamp toward the centerline of the vehicle.

3. The headlamp adjustor mechanism according to claim 1, wherein the indicia includes a centerline indicator and a direction indicator associated with the centerline indicator.

4. The headlamp adjustor mechanism according to claim 3, wherein the direction indicator comprises at least one arrow.

5. The headlamp adjustor mechanism according to claim 1, wherein the indicia includes a centerline indicator and a pair of arrows associated therewith, said arrows pointing in opposite directions, a first arrow pointing toward the centerline indicator, and a second arrow pointing away from the centerline indicator.

6. A headlamp adjustor mechanism including a directing member and drive structure operatively coupled to the directing member, wherein the directing member is engageable with a reflector of a headlamp assembly mounted in a vehicle, and wherein the drive structure is rotatable to effect movement of the directing member and adjust a position of the reflector, said headlamp adjustor mechanism comprising:
a rotatable ring gear coupled to the drive structure and rotatable relative thereto;
indicia on said ring gear relating to which direction to rotate said drive structure to effect movement of the reflector in a direction which is one of toward and away from a centerline of the vehicle, said indicia rendering said headlamp adjustor mechanism usable with headlamp assemblies of the vehicle which are right and left of the centerline of the vehicle, wherein said indicia is accurate with respect to rotation of the drive structure and resulting movement of the reflector regardless of whether the headlamp adjustor mechanism is engaged with a headlamp assembly which is to the right of the centerline of the vehicle or is engaged with a headlamp assembly which is to the left of the centerline of the vehicle.

7. The headlamp adjustor mechanism according to claim 6, wherein the indicia indicates that rotation of the drive structure in an indicated direction moves the headlamp toward the centerline of the vehicle.

8. The headlamp adjustor mechanism according to claim 6, wherein the indicia includes a centerline indicator and a direction indicator associated with the centerline indicator.

9. The headlamp adjustor mechanism according to claim 8, wherein the direction indicator comprises at least one arrow.

10. The headlamp adjustor mechanism according to claim 6, wherein the indicia includes a centerline indicator and a pair of arrows associated therewith, said arrows pointing in opposite directions, a first arrow pointing toward the centerline indicator, and a second arrow pointing away from the centerline indicator.

11. A plurality of headlamp adjustor mechanisms in combination with a vehicle, wherein at least one headlamp adjustor mechanism is positioned right of a centerline of said vehicle and includes first indicia on a rotatable ring gear, and at least one headlamp adjustor mechanism is positioned left of the centerline and includes second indicia on a rotatable ring gear, each of said headlamp adjustor mechanisms being engaged with a reflector of a headlamp assembly of said vehicle and is configured to move the reflector upon actuation of drive structure of said headlamp adjustor mechanism, wherein said first and second indicia are identical and each relates to a direction the reflector moves in response to rotation of the drive structure in a given direction.

12. The plurality of headlamp adjustor mechanisms in combination with a vehicle according to claim 11, wherein each of said first and second indicia indicates that rotation of the drive structure in an indicated direction moves the headlamp toward the centerline of the vehicle.

13. The plurality of headlamp adjustor mechanisms in combination with a vehicle according to claim 11, wherein each of said first and second indicia includes a centerline indicator and a direction indicator associated therewith.

14. The plurality of headlamp adjustor mechanisms in combination with a vehicle according to claim 11, wherein each of said first and second indicia includes a centerline indicator and a plurality of arrows associated therewith.

15. The plurality of headlamp adjustor mechanisms in combination with a vehicle according to claim 11, wherein each of said first and second indicia includes a centerline indicator and a pair of arrows associated therewith, said arrows pointing in opposite directions, a first arrow pointing toward the centerline indicator, and a second arrow pointing away from the centerline indicator.

16. A plurality of headlamp adjustor mechanisms in combination with a vehicle, wherein at least one headlamp adjustor mechanism is positioned right of a centerline of said vehicle and includes a first rotatable indicator coupled to first drive structure, and at least one headlamp adjustor mechanism is positioned left of the centerline and includes a second rotatable indicator coupled to second drive structure, each of said headlamp adjustor mechanisms being engaged with a reflector of a headlamp assembly of said vehicle and being configured to move the reflector upon actuation of respective drive structure, wherein each rotatable indicator is rotatable relative to the drive structure of the respective headlamp adjuster mechanism, wherein said first and second indicators have identical indicia thereon and each indicia relates to a direction the respective reflector moves simultaneous with a provided rotation of the respective drive structure in a given direction.

17. The plurality of headlamp adjustor mechanisms in combination with a vehicle according to claim 16, wherein the indicia indicates that rotation of the drive structure in an indicated direction moves the respective headlamp toward the centerline of the vehicle.

18. The plurality of headlamp adjustor mechanisms in combination with a vehicle according to claim 16, wherein the indicia includes a centerline indicator and a direction indicator associated with the centerline indicator.

19. The plurality of headlamp adjustor mechanisms in combination with a vehicle according to claim 16, wherein the indicia includes a centerline indicator and a plurality of arrows associated therewith.

20. The plurality of headlamp adjustor mechanisms in combination with a vehicle according to claim 16, wherein the indicia includes a centerline indicator and a pair of arrows associated therewith, said arrows pointing in opposite directions, a first arrow pointing toward the centerline indicator, and a second arrow pointing away from the centerline indicator.

* * * * *